United States Patent
Fang et al.

(10) Patent No.: US 11,763,471 B1
(45) Date of Patent: Sep. 19, 2023

(54) METHOD FOR LARGE SCENE ELASTIC SEMANTIC REPRESENTATION AND SELF-SUPERVISED LIGHT FIELD RECONSTRUCTION

(71) Applicant: TSINGHUA UNIVERSITY, Beijing (CN)

(72) Inventors: Lu Fang, Beijing (CN); Jinzhi Zhang, Beijing (CN); Ruofan Tang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 18/300,758

(22) Filed: Apr. 14, 2023

(30) Foreign Application Priority Data

Nov. 2, 2022 (CN) .......................... 202211363939.5

(51) Int. Cl.
  *G06T 7/00* (2017.01)
  *G06T 7/50* (2017.01)
  *G06T 17/00* (2006.01)
  *G06V 10/80* (2022.01)

(52) U.S. Cl.
  CPC ............... *G06T 7/50* (2017.01); *G06T 17/00* (2013.01); *G06V 10/806* (2022.01); *G06T 2207/20081* (2013.01); *G06T 2207/20084* (2013.01)

(58) Field of Classification Search
  CPC . G06T 7/50; G06T 17/00; G06T 2207/20081; G06T 2207/20084; G06V 10/806
  See application file for complete search history.

(56) References Cited

U.S. PATENT DOCUMENTS

| | | | | |
|---|---|---|---|---|
| 11,654,564 | B2* | 5/2023 | Fan | G06T 7/593 |
| | | | | 700/246 |
| 2021/0241527 | A1* | 8/2021 | Sun | G06T 17/20 |

FOREIGN PATENT DOCUMENTS

| | | |
|---|---|---|
| CN | 109447919 | 3/2019 |
| CN | 110070611 | 7/2019 |
| CN | 115115797 | 9/2022 |
| CN | 115239870 | 10/2022 |

OTHER PUBLICATIONS

CNIPA, First Office Action for CN Application No. 202211363939.5, dated Dec. 12, 2022.
CNIPA, Notification to Grant Patent Right for Invention for CN Application No. 202211363939.5, dated Jan. 28, 2023.

(Continued)

*Primary Examiner* — Ping Y Hsieh
(74) *Attorney, Agent, or Firm* — Hodgson Russ LLP

(57) ABSTRACT

A method for large scene elastic semantic representation and self-supervised light field reconstruction is provided. The method includes acquiring a first depth map set corresponding to a target scene, in which the first depth map set includes a first depth map corresponding to at least one angle of view; inputting the first depth map set into a target elastic semantic reconstruction model to obtain a second depth map set, in which the second depth map set includes a second depth map corresponding to the at least one angle of view; and fusing the second depth map corresponding to the at least one angle of view to obtain a target scene point cloud corresponding to the target scene.

8 Claims, 5 Drawing Sheets

(56) References Cited

OTHER PUBLICATIONS

CNIPA, Second Office Action for CN Application No. 202211363939.5, dated Jan. 5, 2023.
Han et al., "OccuSeg: Occupancy-aware 3D Instance Segmentation," IEEE/CVF Conference on Computer Vision and Pattern Recognition (CVPR), 2020.
Jiang et al., "Multi-View Depth Map Sampling for 3D Reconstruction of Natural Scene," Journal of Computer-Aided Design & Computer Graphics, Oct. 2015, vol. 27, No. 10.

\* cited by examiner

METHOD FOR LARGE SCENE ELASTIC SEMANTIC REPRESENTATION AND SELF-SUPERVISED LIGHT FIELD RECONSTRUCTION

CROSS-REFERENCE TO RELATED APPLICATION

This application claims priority to Chinese Patent Application No. 202211363939.5, filed on Nov. 2, 2022, the entire disclosure of which is incorporated herein by reference.

FIELD

The present disclosure relates to the field of computer technology, and especially to a method for large scene elastic semantic representation and self-supervised light field reconstruction, and an apparatus for large scene elastic semantic representation and self-supervised light field reconstruction.

BACKGROUND

Light field reconstruction of a large scene is an important subject in the fields of artificial intelligence and machine vision. It is of great significance for realizing tasks such as environment perception, geometric mapping, representation compression, and angle of view rendering of the scene. Exploring a self-supervised light field reconstruction algorithm of the large scene is also an important prerequisite for large-scale practical application of augmented reality (AR), virtual reality (VR), and other technologies. However, in the related art, the accuracy, integrity, and quality of light field reconstruction are relatively low. Therefore, how to improve the accuracy, integrity, and quality of light field reconstruction has become a major concern of those skilled in the art.

SUMMARY

The present disclosure provides a method for large scene elastic semantic representation and self-supervised light field reconstruction, and an apparatus for large scene elastic semantic representation and self-supervised light field reconstruction. A main object of the present disclosure is to improve the accuracy, integrity, and quality of light field reconstruction.

According to an aspect of the present disclosure, there is provided a method for large scene elastic semantic representation and self-supervised light field reconstruction. The method includes acquiring a first depth map set corresponding to a target scene, in which the first depth map set includes a first depth map corresponding to at least one angle of view; inputting the first depth map set into a target elastic semantic reconstruction model to obtain a second depth map set, in which the second depth map set includes a second depth map corresponding to the at least one angle of view; and fusing the second depth map corresponding to the at least one angle of view to obtain a target scene point cloud corresponding to the target scene.

In some embodiments, acquiring the first depth map set corresponding to the target scene includes acquiring first depth maps, normal vector maps and confidence measure maps corresponding to the at least one angle of view in the target scene by using a light field reconstruction algorithm, in which the first depth maps, the normal vector maps and the confidence measure maps are in one-to-one correspondence; and determining the first depth map set corresponding to the target scene according to the first depth maps, the normal vector maps and the confidence measure maps corresponding to the at least one angle of view.

In some embodiments, inputting the first depth map set into the target elastic semantic reconstruction model to obtain the second depth map set includes determining an elastic semantic representation corresponding to any one of the first depth maps; determining a candidate point set corresponding to the first depth map according to the elastic semantic representation, and a normal vector map and a confidence measure map corresponding to the first depth map, in which the candidate point set includes at least one candidate point; and controlling the at least one candidate point to respectively perform pixel propagation in the first depth map to obtain the second depth map.

In some embodiments, controlling the at least one candidate point to respectively perform pixel propagation in the first depth map to obtain the second depth map includes controlling the at least one candidate point to respectively perform pixel propagation in the first depth map to obtain a second propagation depth map set, in which the second propagation depth map set includes at least one second propagation depth map, and the second propagation depth maps are in one-to-one correspondence to the candidate points; randomly disturbing the first depth map to obtain a first depth; and evaluating the first depth and a second depth corresponding to the at least one second propagation depth map, and selecting a second propagation depth map with an evaluation result satisfying a depth condition as the second depth map.

In some embodiments, evaluating the first depth and the second depth corresponding to the at least one second propagation depth map includes performing a photometric consistency measure, a semantic consistency measure, and a smoothness measure within a reference angle of view across the angles of view on the first depth and the second depth corresponding to the at least one second propagation depth map.

In some embodiments, inputting the first depth map set into the target elastic semantic reconstruction model to obtain the second depth map set includes acquiring an initial elastic semantic reconstruction model; inputting the first depth map set into the initial elastic semantic reconstruction model to obtain a third depth map set; and in response to determining that the third depth map set satisfies a model iteration condition, performing iterative training on the initial elastic semantic reconstruction model until the third depth map set does not satisfy the model iteration condition, obtaining the target elastic semantic reconstruction model, and determining the third depth map set which does not satisfy the model iteration condition as the second depth map set.

In some embodiments, performing iterative training on the initial elastic semantic reconstruction model includes determining a contrastive loss function and a spatial aggregation loss function corresponding to the third depth map set; determining an overall loss function according to the contrastive loss function and the spatial aggregation loss function; and performing backpropagation training on the initial elastic semantic reconstruction model according to the overall loss function.

In some embodiments, the third depth map set includes a third depth map corresponding to the at least one angle of view, and determining the contrastive loss function corresponding to the third depth map set includes determining a confidence corresponding to each pixel in the third depth map corresponding to the at least one angle of view to obtain a target pixel set, in which the target pixel set includes at least one target pixel, and the confidence of the target pixel is not less than a confidence threshold; and determining a sum of contrastive learning loss functions corresponding to all target pixels in the target pixel set as the contrastive loss function.

In some embodiments, the third depth map set includes a third depth map corresponding to the at least one angle of view, and determining the spatial aggregation loss function corresponding to the third depth map set includes performing Gaussian sampling on each pixel in the third depth map corresponding to the at least one angle of view to obtain an inspection point set corresponding to the pixel, in which the inspection point set includes at least one inspection point; and determining the spatial aggregation loss function according to the inspection point set.

According to another aspect of the present disclosure, there is provided a terminal. The terminal includes at least one processor; and a memory communicatively connected with the at least one processor. The memory is stored with instructions executable by the at least one processor that, when executed by the at least one processor, cause the at least one processor to perform the above-mentioned method.

According to another aspect of the present disclosure, there is provided a non-transitory computer-readable storage medium having stored therein computer instructions that, when executed by a computer, cause a computer to perform the above-mentioned method.

According to another aspect of the present disclosure, there is provided a computer program product including a computer program that, when executed by a processor, causes the processor to implement the method of any one of the above-mentioned aspects.

It is to be understood that what is described in this section is not intended to identify key or critical features of embodiments of the present disclosure, nor is it intended to limit the scope of the present disclosure. Other features of the present disclosure will be readily understood from the following description.

BRIEF DESCRIPTION OF THE DRAWINGS

The accompanying drawings are used for a better understanding the present solution and do not constitute a limitation of the present disclosure.

DETAILED DESCRIPTION

Figure 1:
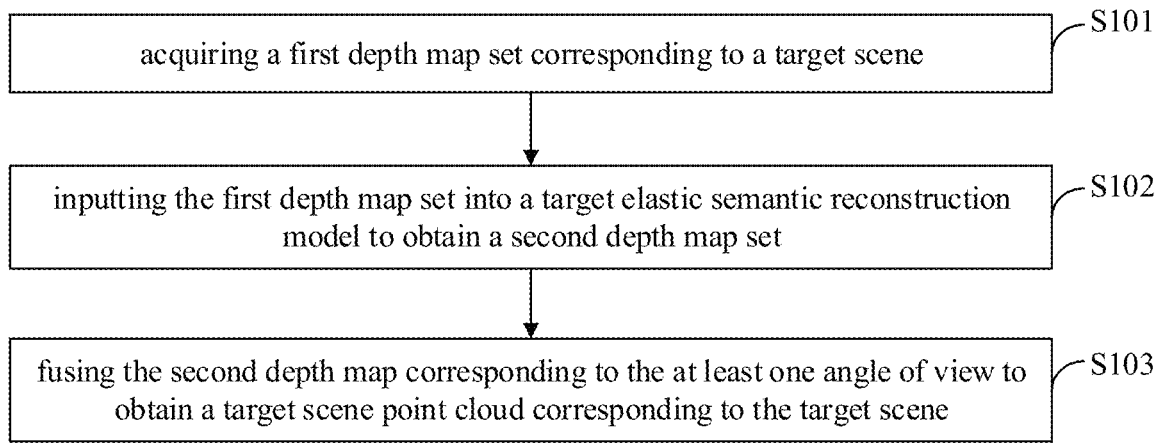
FIG. 1 is a flow chart showing a method for large scene elastic semantic representation and self-supervised light field reconstruction provided by an embodiment of the present disclosure.

Illustrative embodiments of the present disclosure are described below with reference to the accompanying drawings, in which various details of the embodiments of the present disclosure are included to facilitate understanding, and they should be regarded as being merely illustrative.

Therefore, those skilled in the art should realize that various changes and modifications can be made to the embodiments described herein without departing from the scope and spirit of the present disclosure. Also, descriptions of well-known functions and structures are omitted from the following description for clarity and conciseness.

In the related art, light field reconstruction means mainly include laser radar, structured light, stereo vision, etc. The traditional stereo vision algorithm may be a self-supervised light field reconstruction algorithm. The self-supervised light field reconstruction algorithm may be mainly divided into a block matching based reconstruction algorithm and a self-supervised learning based reconstruction algorithm.

In some embodiments, a direct light field imaging device such as laser radar still has disadvantages such as high price, slow imaging speed, and heavy weight of the whole machine, etc., which cannot be popularized on a large scale. A reconstruction algorithm based on structured light has defects, such as being greatly affected by environmental background illumination and having a small sounding range.

In some embodiments, the core principle of the block matching based reconstruction algorithm is to measure a degree of matching by calculating the feature consistency between two image blocks from different angle of views. The working process of the block matching based reconstruction algorithm may be summarized into view selection, matching cost calculation, and depth propagation. After selecting a "reference angle of view", some adjacent angle of views which may provide richer information are selected as "source angle of views", and some depth hypotheses are sampled. The quality of depth sampling is measured by measuring the feature consistency between the "reference angle of view" and the "source angle of view", a current optimal depth hypothesis is left in each iteration, and finally a view-by-view depth map is generated for depth map fusion. The self-supervised learning based reconstruction algorithm is to extract features of each angle of view through a convolutional neural network, construct the feature volume by using the homography projection transformation, output depth maps of each angle of view by using the feature volume regularization and integration, supervise the learning of the network through geometric consistency and photometric consistency of multiple angle of views, and finally fuse depth maps of the multiple angle of views into a scene point cloud. However, the above-mentioned two self-supervised light field reconstruction algorithms completely rely on finding photometric consistency matching from images of multiple angle of views, and their performance is severely constrained by photometric consistency measure, so they can not accurately model non-ideal Lambert surfaces and non-textured areas.

In some embodiments, as the development of implicit representation technologies such as neural radiation field, high-resolution rendering of a new angle of view scene may be realized by uniformly modeling the color, illumination, and volume density distribution of the scene. However, the volume density distribution reconstructed by this method is too smooth, and a fine geometric representation of the scene cannot be extracted through such a volume density representation.

A paradigm of obtaining an implicit space representation from images through a self-supervised learning method has been widely concerned in two-dimensional vision tasks. This method is helpful to get rid of the huge dependence of traditional supervised learning paradigms on manually labeled data. The self-supervised learning method has made great progress on tasks such as object classification, object detection, semantic segmentation, block segmentation, etc. Some algorithms try to apply this method to tasks of multiple angle of views light field reconstruction, extract semantic information from the images through a pre-training network of representation learning, and use it as an additional consistency measure to improve reconstruction results. However, such algorithms only focus on generating semantic representation by using a network and using it for subsequent supervision of consistency measure, and do not make good use of geometric boundary conditions to explicitly constrain semantic representation. At the same time, such algorithms only use image features to partition the scene a priori, and then makes region by region completion. It focuses on learning the semantic partition of an image by using a deep neural network and using it for subsequent multiple angle of views consistency supervision. It cannot use the geometric boundary conditions to constrain the initial semantic partition, and cannot correct the wrong partition, so that the initial wrong partition cannot be corrected, which directly leads to the error of final reconstruction results.

The present disclosure will be described in detail below with reference to specific embodiments.

In an embodiment, as shown in FIG. 1, FIG. 1 is a flow chart showing a method for large scene elastic semantic representation and self-supervised light field reconstruction provided by an embodiment of the present disclosure. This method may be realized by computer programs and may be run on an apparatus for large scene elastic semantic representation and self-supervised light field reconstruction. The computer program may be integrated into an application, or run as an independent tool application.

The apparatus for large scene elastic semantic representation and self-supervised light field reconstruction may be a terminal with functions of large scene elastic semantic representation and self-supervised light field reconstruction. The terminal includes, but is not limited to but is not limited to, a wearable device, a handheld device, a personal computer, a tablets computer, a vehicle-mounted device, a smart phone, a computing device, or other processing devices connected to a wireless modem, etc. The terminal may be called by different names in different networks, for example a user equipment, an access terminal, a subscriber unit, a subscriber station, a mobile station, a mobile, a remote station, a remote terminal, a mobile device, a user terminal, a terminal, a wireless communication device, a user agent or a user apparatus, a cellular phone, a cordless phone, a personal digital assistant (PDA), a $5^{th}$ generation mobile communication technology (5G) network, a $4^{th}$ generation mobile communication technology (4G) network, a $3^{rd}$ generation mobile communication technology (3G) network, or a terminal in a future evolution network, etc.

In some embodiments, the method for large scene elastic semantic representation and self-supervised light field reconstruction includes step S101, step S102, and step S103.

In step S101, a first depth map set corresponding to a target scene is acquired.

According to some embodiments, the target scene refers to a scene that needs light field reconstruction. The target scene does not specifically refer to a fixed scene.

In some embodiments, a first depth map refers to an unoptimized depth map acquired from the target scene. The first depth map does not specifically refer to a fixed depth map. For example, when the target scene changes, the first depth map may change.

In some embodiments, the first depth map set refers to a set formed by the convergence of first depth maps corresponding to at least one angle of view. The first depth map set does not specifically refer to a fixed set. For example, when the target scene changes, the first depth map set may change. When the first depth map changes, the first depth map set may also change.

It is easy to understand that when a terminal performs the large scene elastic semantic representation and self-supervised light field reconstruction, the terminal may acquire the first depth map set corresponding to the target scene.

In step S102, the first depth map set is inputted into a target elastic semantic reconstruction model to obtain a second depth map set.

According to some embodiments, the target elastic semantic reconstruction model refers to a trained model for reconstructing the first depth map. The target elastic semantic reconstruction model does not specifically refer to a fixed model. The target elastic semantic reconstruction model may be obtained by iterative joint optimization of elastic semantic representation and scene geometry. Specifically, when the iterative joint optimization is carried out through elastic semantic representation and scene geometry, the depth consistency and boundary occlusion relationship of connected areas on a surface of an object are taken as self-supervised signals to supervise a neural network to learn pixel-by-pixel semantic features. Such elastic semantic representation with variable scale and shape is further used for more accurate depth reconstruction to form an iterative optimization process.

In some embodiments, the iterative optimization process does not need additional depth supervision signals as training data, which belongs to an unsupervised learning method.

In some embodiments, the second depth map refers to a depth map generated after the target elastic semantic reconstruction model is reconstructed according to the first depth map. The fineness of the second depth map is greater than that of the first depth map. The second depth map is in one-to-one correspondence to the first depth map. The second depth map may be, for example, a robust depth map based on elastic semantics.

In some embodiments, the second depth map set refers to a set formed by the convergence of second depth maps corresponding to the at least one angle of view. The second depth map set does not specifically refer to a fixed set. For example, when the first depth map set changes, the second depth map set may change. When the target elastic semantic reconstruction model changes, the second depth map set may also change.

It is easy to understand that, when the terminal acquires the first depth map set corresponding to the target scene, the terminal may input the first depth map set into the target elastic semantic reconstruction model to obtain the second depth map set.

In step S103, the second depth map corresponding to the at least one angle of view is fused to obtain a target scene point cloud corresponding to the target scene.

According to some embodiments, a scene point cloud refers to a data set composed of three-dimensional points in a certain scene. The target scene point cloud is a data set composed of three-dimensional points in the target scene.

In some embodiments, information contained in a three-dimensional point includes, but is not limited to but is not limited to, three-dimensional coordinates X, Y, Z, color, a classification value, an intensity value, and time, etc.

It is easy to understand that when the terminal acquires the second depth map set, the terminal may fuse the second depth map corresponding to the at least one angle of view to obtain the target scene point cloud corresponding to the target scene.

To sum up, in the method provided by the embodiment of the present disclosure, the first depth map set corresponding to the target scene is acquired. The first depth map set is inputted into the target elastic semantic reconstruction model to obtain the second depth map set. The second depth map corresponding to the at least one angle of view is fused to obtain the target scene point cloud corresponding to the target scene. Therefore, the first depth map set may be reconstructed by using the target elastic semantic reconstruction model obtained by the iterative joint optimization of elastic semantic representation and scene geometry. Thus, it is unnecessary to use additional depth supervision signals as training data, the accuracy, integrity and quality of light field reconstruction may be improved, and high quality, high integrity and high precision light field reconstruction results may be acquired.

Figure 2:
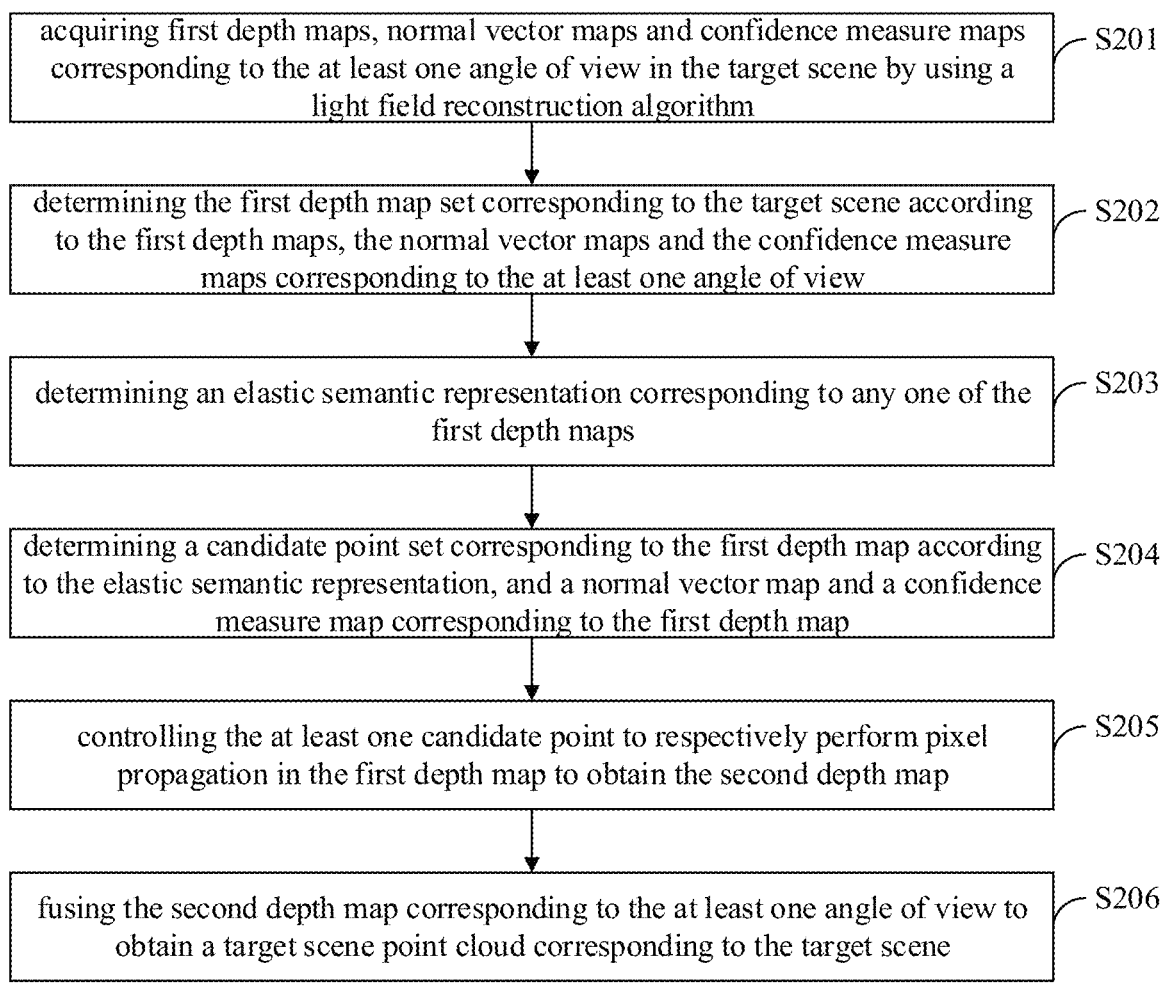
FIG. 2 is a flow chart showing another method for large scene elastic semantic representation and self-supervised light field reconstruction provided by an embodiment of the present disclosure.

Referring to FIG. 2. FIG. 2 is a flow chart showing another method for large scene elastic semantic representation and self-supervised light field reconstruction provided by an embodiment of the present disclosure. The method may be executed by a terminal. In some embodiments, the method for large scene elastic semantic representation and self-supervised light field reconstruction includes steps S201 to S206.

In step S201, first depth maps, normal vector maps and confidence measure maps corresponding to the at least one angle of view in the target scene are acquired by using a light field reconstruction algorithm.

According to some embodiments, the first depth maps, the normal vector maps and the confidence measure maps are in one-to-one correspondence.

According to some embodiments, the light field reconstruction algorithm includes, but is not limited to but is not limited to, a block matching based reconstruction algorithm, a multiple view stereo (MVS) light field reconstruction algorithm, a structure-from-motion (SFM) light field reconstruction algorithm, etc.

In some embodiments, the block matching refers to image denoising. That is, K blocks closest to a query block are found from adjacent image blocks by matching the query block with the adjacent image blocks, where K is a positive integer. The so-called adjacency is not an absolute position adjacency, which may lead to local and non-local search.

In some embodiments, the normal vector maps refer to a texture map that stores normal vector information in the first depth map. The normal vector maps may describe normal vector of each pixel in the first depth map.

In some embodiments, the confidence measure maps refer to a measure map used to evaluate the quality of an image. In the embodiment of the present disclosure, the confidence measure map is used to evaluate the quality of the corresponding first depth map.

It is easy to understand that when the terminal performs large scene elastic semantic representation and self-supervised light field reconstruction, the terminal may use the light field reconstruction algorithm to acquire a first depth map ($D_i$), a normal vector map ($n_i$) and a confidence measure map ($C_i$) corresponding to each angle of view i in the target scene, where i is a positive integer.

In step S202, the first depth map set corresponding to the target scene is determined according to the first depth maps, the normal vector maps and the confidence measure maps 25 corresponding to the at least one angle of view.

It is easy to understand that when the terminal acquires the first depth map ($D_i$), the normal vector map ($n_i$) and the confidence measure map ($C_i$) corresponding to each the angle of view i, the terminal may converge the first depth map ($D_i$), the normal vector map ($n_i$) and the confidence measure map ($C_i$) corresponding to each the angle of view i into a set to obtain the first depth map 30 set corresponding to the target scene.

In step S203, an elastic semantic representation corresponding to any one of the first depth maps is determined.

According to some embodiments, semantic representation refers to the process of arranging words into a text sequence that expresses certain news content according to rules such as grammatical structure, compositional structure, and writing skills, etc.

It is easy to understand that when the terminal acquires the first depth map set corresponding to the target scene, the terminal may determine the elastic semantic representation corresponding to any one of the first depth maps ($D_i$) in the first depth map set.

In step S204, a candidate point set corresponding to the first depth map is determined according to the elastic semantic representation, and a normal vector map and a confidence measure map corresponding to the first depth map.

According to some embodiments, when the first depth map set is inputted into the target elastic semantic reconstruction model, a fine depth map may be generated by using the elastic semantic representation in the target elastic semantic reconstruction model. That is, the fine depth map may be realized, namely, the generation of a second depth map, through a matching and propagation module based on the elastic semantic representation.

Figure 3:
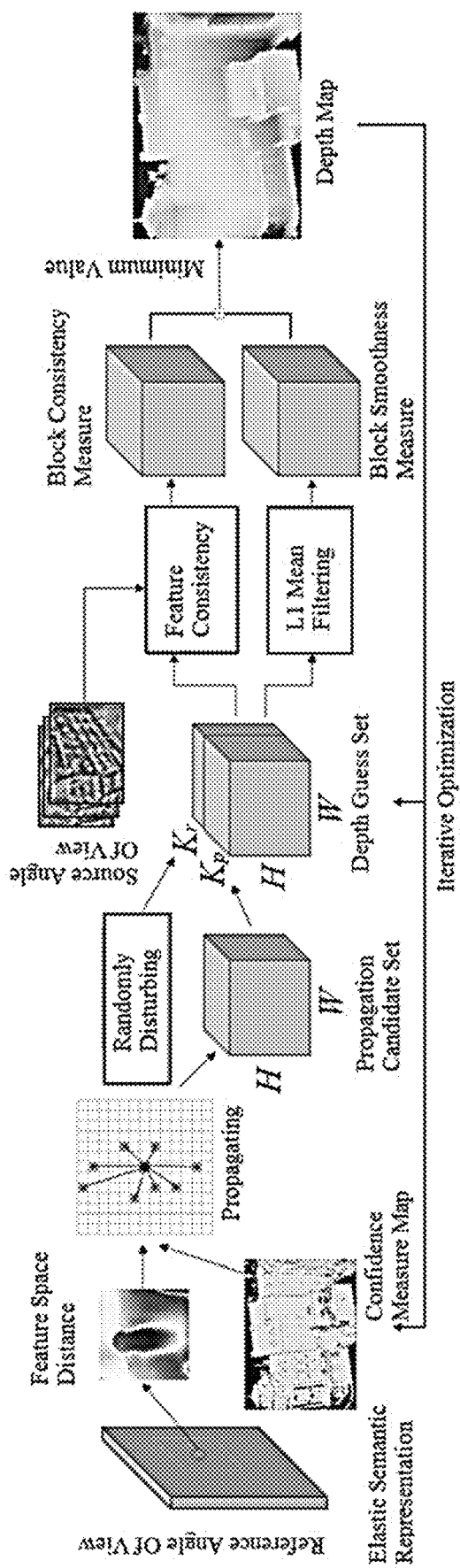
FIG. 3 is a flow chart showing the generation of a second depth map provided by an embodiment of the present disclosure.

It is easy to understand that FIG. 3 is a flow chart showing the generation of a second depth map provided by an embodiment of the present disclosure. As shown in FIG. 3, when the terminal acquires the elastic semantic representation corresponding to any one of first depth maps ($D_i$) in the first depth map set, the terminal may determine the candidate point set corresponding to the first depth map ($D_i$) according to the elastic semantic representation, and the normal vector map and a confidence measure map corresponding to the first depth map ($D_i$). The candidate point set includes at least one candidate point.

In step S205, the at least one candidate point is controlled to respectively perform pixel propagation in the first depth map to obtain the second depth map.

According to some embodiments, when the terminal controls the at least one candidate point to respectively perform pixel propagation in the first depth map, predicted values of the current depth and normal may be propagated to neighboring pixels in the range of 10*10 based on elastic semantic similarity by using the neighborhood plane hypothesis, so as to expect the accurate geometric prediction of a current pixel may be propagated to a full map to obtain a final fine reconstruction result.

According to some embodiments, as shown in FIG. 3, when the terminal controls the at least one candidate point to respectively perform pixel propagation in the first depth map to obtain the second depth map, first, it may control the at least one candidate point to respectively perform pixel propagation in the first depth map to obtain a second propagation depth map set. Then, the first depth map may be randomly disturbed to obtain a first depth. Finally, the first depth and a second depth corresponding to the at least one second propagation depth map may be evaluated, and a second propagation depth map with an evaluation result satisfying a depth condition is selected as the second depth map.

In some embodiments, the second propagation depth map set is a propagation candidate set, and includes at least one second propagation depth map. The second propagation depth maps are in one-to-one correspondence to the candidate points.

In some embodiments, when the first depth map is randomly disturbed, a disturbance candidate set is obtained. The disturbance candidate set may include at least one disturbance depth map, and each disturbance depth map corresponds to a second depth.

In some embodiments, the propagation candidate set and the disturbance candidate set may be aggregated into one set, namely a depth guess set.

In some embodiments, when evaluating the first depth and the second depth corresponding to the at least one second propagation depth map, a multiple angle of views consistency measure is investigated for the first depth and the second depth corresponding to the at least one second propagation depth map. The multiple angle of views consistency measure includes, but is not limited to a photometric consistency measure, a semantic consistency measure, a smoothness measure, a structural similarity (SSIM) consistency measure, an L1 consistency measure, an L2 consistency measure, and the like.

The photometric consistency measure includes, but is not limited to a photometric consistency measure across the angle of view, a photometric consistency measure based on bidirectional normalized cross-correlation (NCC), and the like. The semantic consistency measure may be, for example, a semantic consistency measure based on the above-mentioned semantic representation. The smoothness measure may be, for example, a smoothness measure within a reference angle of view.

For example, as shown in FIG. 3, L1 mean filtering may be used to measure the smoothness of any one of images in the depth guess set to obtain a first measure value. At the same time, a block consistency measure is performed by performing feature consistency comparison on an image corresponding to a source angle of view and the image to obtain a second measure value. Finally, a third measure value is obtained by adding the first measure value and the second measure value. Next, a third measure value corresponding to each image in the depth guess set may be acquired, and an image with a smallest third measure value is selected as the second depth map.

In some embodiments, other depth map smoothing methods such as guided filtering may also be used for image matching.

In some embodiments, the combination of various measure methods may make full use of geometric cues provided by the above-mentioned semantic representation, and enable reliable reconstruction results generated in geometric texture-rich areas in an early iteration to be successfully propagated to non-Lambert surfaces and non-textured areas in a subsequent iteration process, thus forming a depth map reconstruction results with sharp edges and smooth in-plane.

It is easy to understand that when the terminal acquires the candidate point set corresponding to any one of first depth maps ($D_i$) in the first depth map set, the terminal may control the at least one candidate point in the candidate point set to respectively perform pixel propagation in the first depth map ($D_i$) to obtain the second depth map. Finally, at least one second depth map corresponding to at least one first depth map in the first depth map set is acquired, namely, the second depth map set.

In step S206, the second depth map corresponding to the at least one angle of view is fused to obtain a target scene point cloud corresponding to the target scene.

According to some embodiments, when the terminal fuses the second depth map corresponding to the at least one angle of view to obtain the target scene point cloud corresponding to the target scene, it can perform photometric consistency filtering and geometric consistency filtering on the second depth map corresponding to the at least one angle of view. Finally, a complete scene point cloud may be reconstructed to obtain the target scene point cloud corresponding to the target scene.

It is easy to understand that when the terminal acquires the second depth map set, the terminal may fuse the second depth map corresponding to the at least one angle of view to obtain the target scene point cloud corresponding to the target scene.

To sum up, in the method provided by the embodiments of the present disclosure, the first depth maps, the normal vector maps and the confidence measure maps corresponding to the at least one angle of view in the target scene are acquired by using the light field reconstruction algorithm. The first depth map set corresponding to the target scene is determined according to the first depth maps, the normal vector maps and the confidence measure maps corresponding to the at least one angle of view. The elastic semantic representation corresponding to any one of the first depth maps is determined. The candidate point set corresponding to the first depth map is determined according to the elastic semantic representation, and the normal vector map and the confidence measure map corresponding to the first depth map. The at least one candidate point is controlled to respectively perform pixel propagation in the first depth map to obtain the second depth map. The second depth map corresponding to the at least one angle of view is fused to obtain a target scene point cloud corresponding to the target scene. Therefore, by fully combining respective advantages of the traditional matching method and the deep learning method, the first depth map set may be reconstructed by using the target elastic semantic reconstruction model obtained by the iterative joint optimization of elastic semantic representation and scene geometry. Thus, it is unnecessary to use additional depth supervision signals as training data, a complete surface may be reconstructed on the premise of ensuring the reconstruction accuracy, the accuracy, integrity and quality of light field reconstruction may be improved, and high-quality, high-integrity and high-precision light field reconstruction results may be obtained. At the same time, the method provided by the embodiment of the present disclosure may provide effective scene structure information for applications such as AR/VR, including but not limited to realizing efficient scene fusion, rendering and compressed transmission based on this.

Figure 4:
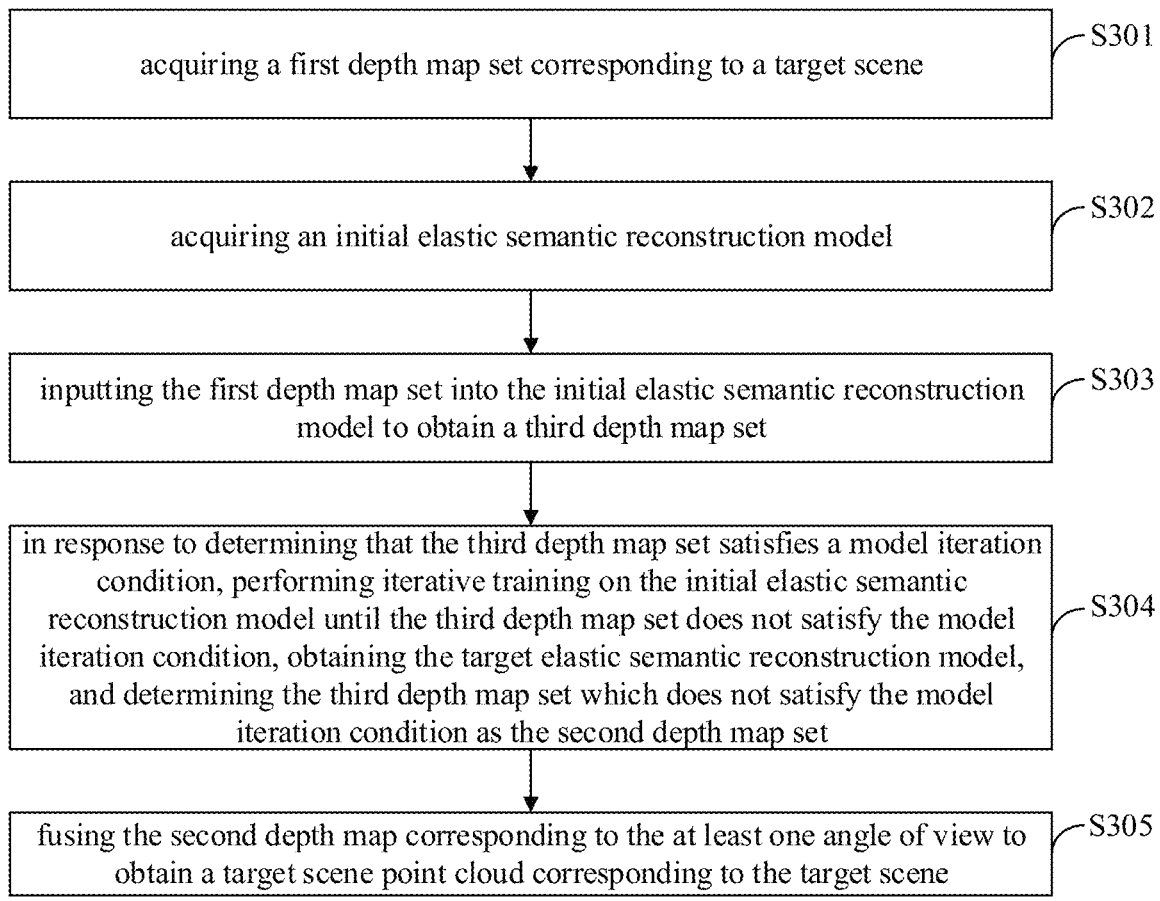
FIG. 4 is a flow chart showing another method for large scene elastic semantic representation and self-supervised light field reconstruction provided by an embodiment of the present disclosure.

Referring to FIG. 4, FIG. 4 is a flow chart showing another method for large scene elastic semantic representation and self-supervised light field reconstruction provided by an embodiment of the present disclosure. The method may be executed by a terminal. In some embodiments, the method for large scene elastic semantic representation and self-supervised light field reconstruction includes steps S301 to S305.

In step S301, a first depth map set corresponding to a target scene is acquired.

The specific process is as above, which will not be elaborated.

In step S302, an initial elastic semantic reconstruction model is acquired.

According to some embodiments, the initial elastic semantic reconstruction model refers to an untrained elastic semantic reconstruction model. The initial elastic semantic reconstruction model does not specifically refer to a fixed model. For example, when a type of the neural network structure corresponding to the initial elastic semantic reconstruction model changes, the initial elastic semantic reconstruction model may change. When model parameters corresponding to the initial elastic semantic reconstruction model change, the initial elastic semantic reconstruction model may also change.

In some embodiments, different network designs may be used for the initial elastic semantic reconstruction model to generate a representation of semantic space for the output multiple angle of views images.

It is easy to understand that the terminal may acquire the initial elastic semantic reconstruction model when performing large scene elastic semantic representation and self-supervised light field reconstruction.

In step S303, the first depth map set is inputted into the initial elastic semantic reconstruction model to obtain a third depth map set.

According to some embodiments, the third depth map refers to a depth map generated by the initial elastic semantic reconstruction model according to the first depth map. The third depth maps are in one-to-one correspondence to the first depth maps.

In some embodiments, the third depth map set refers to a set formed by the convergence of third depth maps corresponding to the at least one angle of view.

It is easy to understand that when the terminal acquires the first depth map set and the initial elastic semantic reconstruction model, the terminal may input the first depth map set into the initial elastic semantic reconstruction model to obtain the third depth map set.

In step S304, in response to determining that the third depth map set satisfies a model iteration condition, iterative training is performed on the initial elastic semantic reconstruction model until the third depth map set does not satisfy the model iteration condition, the target elastic semantic reconstruction model is obtained, and the third depth map set which does not satisfy the model iteration condition is determined as the second depth map set.

According to some embodiments, the model iteration condition may be, for example, that the accuracy of any one of the third depth maps in the third depth map set is less than a accuracy threshold, or a confidence of any one of the third depth maps in the third depth map set is less than a confidence threshold.

According to some embodiments, when iterative training is performed on the initial elastic semantic reconstruction model, firstly, a contrastive loss function and a spatial aggregation loss function corresponding to the third depth map set may be determined. Then, an overall loss function may be determined according to the contrastive loss function and the spatial aggregation loss function. Finally, back-propagation training may be performed on the initial elastic semantic reconstruction model according to the overall loss function.

In some embodiments, in order to obtain a reliable and compact scene semantic representation from multiple angle of views images and rough geometric initialization supervision, elastic semantics may be learned by using a "contrastive learning" method. That is, training is performed on the initial elastic semantic reconstruction model by using the contrastive loss function. In some embodiments, for each given pixel p in the image, a set of points $\{q|q \in S_p\}$ may be Gaussian sampled as an inspection point, and a sum of the distance from q to a plane where p is located and the distance from p to a plane where q is located may be defined as the geometric distance between the two. When the geometric distance between the two is less than a threshold $\epsilon$, p and q are defined as positive sample pairs, otherwise they are defined as negative sample pairs.

According to some embodiments, the terminal may determine a confidence corresponding to each pixel in the third depth map corresponding to the at least one angle of view to obtain a target pixel set when determining the contrastive loss function corresponding to the third depth map set. Then, the terminal may determine a sum of contrastive learning loss functions corresponding to all target pixels in the target pixel set as the contrastive loss function. Therefore, representations of positive sample pairs may be gathered together in the feature space, and representation functions of negative sample pairs may be pushed farther away in the feature space. Therefore, the pixel-by-pixel semantic features may be learned through the neural network by using the "contrastive learning" method. The elastic semantic representation obtained in this way has characteristics of scale, shape variability and boundary preservation, which may provide reliable guidance for pixel-by-pixel multiple angle of views association search.

In some embodiments, the target pixel set includes at least one target pixel, and the confidence of the target pixel is not less than a confidence threshold $\xi$.

In some embodiments, the contrastive learning loss function may be, for example, an InfoNCE loss function.

According to some embodiments, when the terminal determines the spatial aggregation loss function corresponding to the third depth map set, Gaussian sampling may be performed on each pixel p in the third depth map corresponding to the at least one angle of view to obtain an inspection point set $S_p$ corresponding to the pixel p. Then, the spatial aggregation loss function may be determined according to the inspection point set $S_p$.

In some embodiments, the inspection point set $S_p$ includes at least one inspection point q.

In some embodiments, the inspection point set $S_p$ may also be acquired by other sampling methods other than the Gaussian sampling. For example, uniform random sampling, importance sampling, etc.

In some embodiments, when the spatial aggregation loss function is determined according to the inspection point set $S_p$, the spatial aggregation loss function may be defined on the inspection point set $S_p$. Therefore, the distance of the feature space and the distance of the pixel space may be made to have a positive correlation, so that the similarity of semantic representation shows an isotropic decay with distance.

According to some embodiments, when the overall loss function is determined according to the contrastive loss function and the spatial aggregation loss function, a weighted sum of the contrastive loss function and the spatial aggregation loss function may be taken as the overall loss function, and the elastic semantic representation is trained by using backpropagation. Therefore, reliable semantic representations may be made to propagate from regions of high confidence to regions of low confidence while ensuring retaining geometric boundaries.

In some embodiments, other loss function constraints (such as smoothness loss function, etc.) may be added on the basis of the contrastive loss function and the spatial aggregation loss function to determine the overall loss function, so as to improve the accuracy and precision of acquiring the third depth map set and accuracy.

According to some embodiments, when acquiring the target elastic semantic reconstruction model, the target elastic semantic reconstruction model may be trained and tested by using a test data set. The test results show that the method provided by the embodiment of the present disclosure may effectively improve the integrity of scene reconstruction on the premise of retaining the reconstruction accuracy, and has obvious improvements in overall reconstruction accuracy and visual effects compared with related arts.

In some embodiments, the test data set may be, for example, a Tanks & Temples data set, a DTU indoor small scene data set, and the like.

In some embodiments, under the DTU indoor small scene data set, the method provided by the embodiment of the present disclosure may generate a high-integrity and high-precision light field scene reconstruction result. In some embodiments, data of 40 scenes in the DTU indoor small scene data set may be selected for testing. According to the chamfer distance (CD) standard of DTU, the method provided by the embodiment of the present disclosure shows the optimal performance in accuracy and overall indexes, and shows comparable effects simultaneously compared with related arts.

In some embodiments, under the Tanks & Temples data set, the method provided by the embodiment of the present disclosure may generate high-precision and high-integrity light field reconstruction results in real environment illumination and multi-object complex scenes. According to the F-score standard of Tanks & Temples for point cloud evaluation (a ratio of less than 2 mm), the method provided by the embodiment of the present disclosure may realize optimal results on intermediate and advanced data sets over related arts, and significantly outperform other algorithms in related arts.

Figure 5:
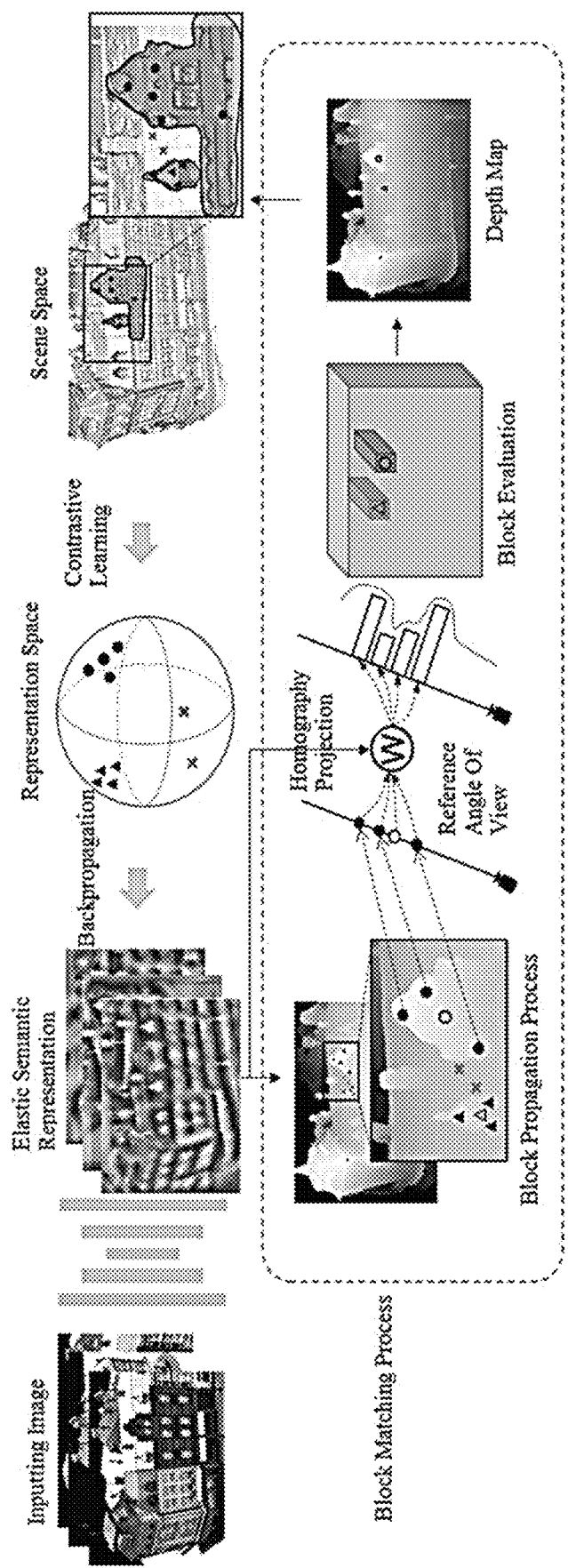
FIG. 5 is a flow chart showing model joint optimization provided by an embodiment of the present disclosure.

It is easy to understand that FIG. 5 is a flow chart showing model joint optimization provided by an embodiment of the present disclosure. As shown in FIG. 5, the terminal may use an input image (the first depth map) and its corresponding elastic semantic representation for block matching and propagation to obtain a relatively rough depth map (the third depth map). The relatively rough depth map may be further used by a network to learn a finer elastic semantic representation and form an iterative joint optimization process.

In step S305, the second depth map corresponding to the at least one angle of view is fused to obtain a target scene point cloud corresponding to the target scene.

The specific process is as above, which will not be elaborated.

To sum up, in the method provided by the embodiment of the present disclosure, the first depth map set corresponding to the target scene is acquired. The initial elastic semantic reconstruction model is acquired. The first depth map set is inputted into the initial elastic semantic reconstruction model to obtain the third depth map set. In response to determining that the third depth map set satisfies the model iteration condition, iterative training is performed on the initial elastic semantic reconstruction model until the third depth map set does not satisfy the model iteration condition, the target elastic semantic reconstruction model is obtained, and the third depth map set which does not satisfy the model iteration condition is determined as the second depth map set. The second depth map corresponding to the at least one angle of view is fused to obtain a target scene point cloud corresponding to the target scene. Therefore, by fully combining respective advantages of the traditional matching method and the deep learning method, the first depth map set may be reconstructed by using the target elastic semantic reconstruction model obtained by the iterative joint optimization of elastic semantic representation and scene geometry. Thus, it is unnecessary to use additional depth supervision signals as training data, a complete surface may be reconstructed on the premise of ensuring the reconstruction accuracy, the accuracy, integrity and quality of light field reconstruction may be improved, and high-quality, high-integrity and high-precision light field reconstruction results may be obtained. At the same time, the method provided by the embodiment of the present disclosure may provide effective scene structure information for applications such as AR/VR, including but not limited to realizing efficient scene fusion, rendering and compressed transmission based on this.

In the technical solution of the present disclosure, the collection, storage, use, processing, transmission, provision, and disclosure of personal information of users involved are all comply with the provisions of relevant laws and regulations, and do not violate public order and good customs.

The following are apparatus embodiments of the present disclosure, which may be used to implement method embodiments of the present disclosure. For details not disclosed in the apparatus embodiments of the present disclosure, please refer to the method embodiments of the present disclosure.

Figure 6:
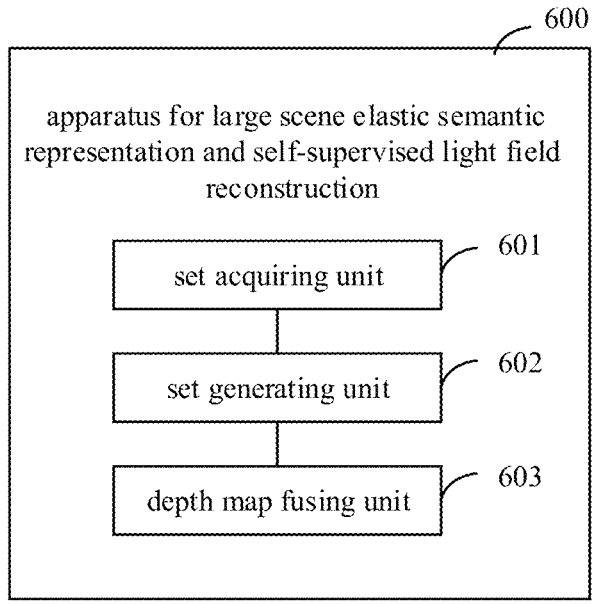
FIG. 6 is a schematic diagram showing an apparatus for large scene elastic semantic representation and self-supervised light field reconstruction provided by an embodiment of the present disclosure.

Referring to FIG. 6, FIG. 6 is a schematic diagram showing an apparatus for large scene elastic semantic representation and self-supervised light field reconstruction provided by an embodiment of the present disclosure. The apparatus for large scene elastic semantic representation and self-supervised light field reconstruction may be implemented as all or a part of an apparatus through software, hardware or a combination thereof. The apparatus 600 for large scene elastic semantic representation and self-supervised light field reconstruction includes a set acquiring unit 601, a set generating unit 602 and a depth map fusing unit 603.

The set acquiring unit 601 is configured to acquire a first depth map set corresponding to a target scene, in which the first depth map set includes a first depth map corresponding to at least one angle of view.

The set generating unit 602 is configured to input the first depth map set into a target elastic semantic reconstruction model to obtain a second depth map set, in which the second depth map set includes a second depth map corresponding to the at least one angle of view.

The depth map fusing unit 603 is configured to fuse the second depth map corresponding to the at least one angle of view to obtain a target scene point cloud corresponding to the target scene.

In some embodiments, when the set acquiring unit 601 is configured to acquire the first depth map set corresponding to the target scene, it is specifically configured to acquire first depth maps, normal vector maps and confidence measure maps corresponding to the at least one angle of view in the target scene by using a light field reconstruction algorithm, in which the first depth maps, the normal vector maps and the confidence measure maps are in one-to-one correspondence; and determine the first depth map set corresponding to the target scene according to the first depth maps, the normal vector maps and the confidence measure maps corresponding to the at least one angle of view.

In some embodiments, when the set generating unit 602 is configured to input the first depth map set into the target elastic semantic reconstruction model to obtain the second depth map set, it is specifically configured to determine an elastic semantic representation corresponding to any one of the first depth maps; determine a candidate point set corresponding to the first depth map according to the elastic semantic representation, and a normal vector map and a confidence measure map corresponding to the first depth map, in which the candidate point set includes at least one candidate point; and control the at least one candidate point to respectively perform pixel propagation in the first depth map to obtain the second depth map.

In some embodiments, when the set generating unit 602 is configured to control the at least one candidate point to respectively perform pixel propagation in the first depth map to obtain the second depth map, it is specifically configured to control the at least one candidate point to respectively perform pixel propagation in the first depth map to obtain a second propagation depth map set, in which the second propagation depth map set includes at least one second propagation depth map, and the second propagation depth maps are in one-to-one correspondence to the candidate points; randomly disturb the first depth map to obtain a first depth; and evaluate the first depth and a second depth corresponding to the at least one second propagation depth map, and select a second propagation depth map with an evaluation result satisfying a depth condition as the second depth map.

In some embodiments, when the set generating unit 602 is configured to evaluate the first depth and the second depth corresponding to the at least one second propagation depth map, it is specifically configured to perform a photometric consistency measure, a semantic consistency measure, and a smoothness measure within a reference angle of view across the angles of view on the first depth and the second depth corresponding to the at least one second propagation depth map.

In some embodiments, when the set generating unit 602 is configured to input the first depth map set into the target elastic semantic reconstruction model to obtain the second depth map set, it is specifically configured to acquire an initial elastic semantic reconstruction model; input the first depth map set into the initial elastic semantic reconstruction model to obtain a third depth map set; and in response to determining that the third depth map set satisfies a model iteration condition, perform iterative training on the initial elastic semantic reconstruction model until the third depth map set does not satisfy the model iteration condition, obtain the target elastic semantic reconstruction model, and determine the third depth map set which does not satisfy the model iteration condition as the second depth map set.

In some embodiments, when the set generating unit 602 is configured to perform iterative training on the initial elastic semantic reconstruction model, it is specifically configured to determine a contrastive loss function and a spatial aggregation loss function corresponding to the third depth map set; determine an overall loss function according to the contrastive loss function and the spatial aggregation loss function; and perform backpropagation training on the initial elastic semantic reconstruction model according to the overall loss function.

In some embodiments, the third depth map set includes a third depth map corresponding to the at least one angle of view, and when the set generating unit 602 is configured to determine the contrastive loss function corresponding to the third depth map set, it is specifically configured to determine a confidence corresponding to each pixel in the third depth map corresponding to the at least one angle of view to obtain a target pixel set, in which the target pixel set includes at least one target pixel, and the confidence of the target pixel is not less than a confidence threshold; and determine a sum of contrastive learning loss functions corresponding to all target pixels in the target pixel set as the contrastive loss function.

In some embodiments, the third depth map set includes a third depth map corresponding to the at least one angle of view, and when the set generating unit 602 is configured to determine the spatial aggregation loss function corresponding to the third depth map set, it is specifically configured to perform Gaussian sampling on each pixel in the third depth map corresponding to the at least one angle of view to obtain an inspection point set corresponding to the pixel, in which the inspection point set includes at least one inspection point; and determine the spatial aggregation loss function according to the inspection point set.

It is to be noted that the apparatus for large scene elastic semantic representation and self-supervised light field reconstruction provided by the above-mentioned embodiments merely exemplifies the division of the above-mentioned functional modules when executing the method for large scene elastic semantic representation and self-supervised light field reconstruction. In practical applications, the above-mentioned function may be completed by allocating it to different functional modules according to needs. That is, internal structure of the apparatus is divided into different functional modules, so as to complete all or part of the functions described above. In addition, the apparatus for large scene elastic semantic representation and self-supervised light field reconstruction provided by the above-mentioned embodiments belongs to the same concept as the embodiment of the method for large scene elastic semantic representation and self-supervised light field reconstruction. The implementation process of the apparatus for large scene elastic semantic representation and self-supervised light field reconstruction is detailed in the method embodiment, which will not be elaborated.

To sum up, in the apparatus provided by the embodiment of the present disclosure, the set acquiring unit is configured to acquire the first depth map set corresponding to the target scene, in which the first depth map set includes the first depth map corresponding to the at least one angle of view. The set generating unit is configured to input the first depth map set into the target elastic semantic reconstruction model to obtain the second depth map set, in which the second depth map set includes the second depth map corresponding to the at least one angle of view. The depth map fusing unit is configured to fuse the second depth map corresponding to the at least one angle of view to obtain the target scene point cloud corresponding to the target scene. Therefore, the first depth map set may be reconstructed by using the target elastic semantic reconstruction model obtained by the iterative joint optimization of elastic semantic representation and scene geometry. Thus, it is unnecessary to use additional depth supervision signals as training data, the accuracy, integrity and quality of light field reconstruction may be improved, and high quality, high integrity and high precision light field reconstruction results may be acquired.

In the technical solution of the present disclosure, the collection, storage, use, processing, transmission, provision, and disclosure of personal information of users involved are all comply with the provisions of relevant laws and regulations, and do not violate public order and good customs.

According to an embodiment of the present disclosure, the present disclosure also provides a terminal. The terminal includes at least one processor; and a memory communicatively connected with the at least one processor. The memory is stored with instructions executable by the at least one processor that, when executed by the at least one processor, cause the at least one processor to perform the above-mentioned method.

Figure 7:
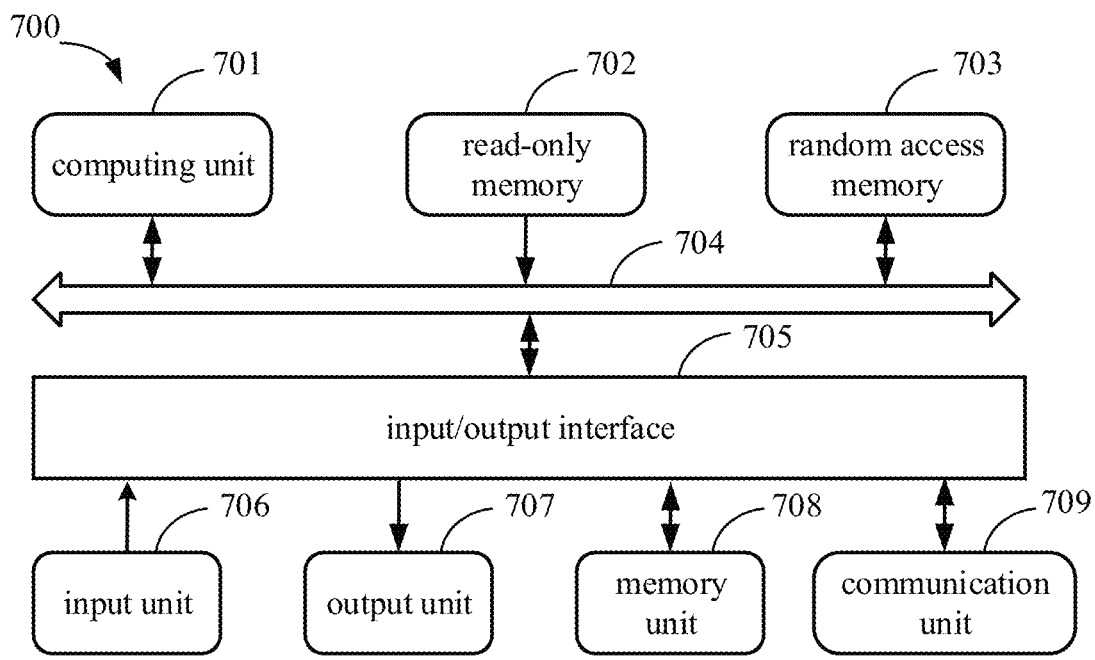
FIG. 7 is a block diagram showing a terminal used to implement a method for large scene elastic semantic representation and self-supervised light field reconstruction according to an embodiment of the present disclosure.

FIG. 7 is a block diagram showing an illustrative terminal 700 that may be used to implement embodiments of the present disclosure. Components shown herein, their connections and relationships, and their functions are only illustrative, and are not intended to limit the implementations of the present disclosure described and/or claimed herein.

As shown in FIG. 7, the terminal 700 includes a computing unit 701 that can perform various appropriate actions and processes according to a computer program stored in a read-only memory (ROM) 702 or loaded from a memory unit 708 into a random access memory (RAM) 703. In the RAM 703, various programs and data required for the operation of the terminal 700 may also be stored. The computing unit 701, the ROM 702, and the RAM 703 are connected to each other via a bus 704. An input/output (I/O) interface 705 is also connected to the bus 704.

A plurality of components in the terminal 700 are connected to the I/O interface 705, including an input unit 706, such as a keyboard, and a mouse; an output unit 707, such as various types of displays, and speakers; a memory unit 708, such as a magnetic disk, and an optical disk; and a communication unit 709, such as a network card, a modulator-demodulator, and a wireless communication transceiver. The communication unit 709 allows the terminal 700 to exchange information/data with other devices via a computer network such as Internet and/or various telecommunications networks.

The computing unit 701 may be various generic and/or specific processing assemblies with processing and computational capabilities. Some examples of the computing unit 701 include, but are not limited to, central processing units (CPUs), graphics processing units (GPUs), various specific artificial intelligence (AI) computing chips, various computing units that run machine learning model algorithms, digital signal processors (DSPs), and any appropriate processors, controllers, and microcontrollers. The computing unit 701 is configured to execute the various methods and processes described above, for example the method for large scene elastic semantic representation and self-supervised light field reconstruction. For example, in some embodiments, the method for large scene elastic semantic representation and self-supervised light field reconstruction may be implemented as a computer software program that is tangibly embodied on a machine-readable medium, such as the memory unit 708. In some embodiments, part or all of computer programs may be loaded and/or installed on the terminal 700 via the ROM 702 and/or the communication unit 709. When a computer program is loaded into the RAM 703 and executed by the computing unit 701, one or more steps of the method for large scene elastic semantic representation and self-supervised light field reconstruction described above may be executed. Alternatively, in other embodiments, the computing unit 701 may be configured to execute the method for large scene elastic semantic representation and self-supervised light field reconstruction by any other suitable means (e.g., by means of a firmware).

Various implementations of the systems and techniques above-described herein may be implemented in digital electronic circuit systems, integrated circuit systems, field programmable gate arrays (FPGAs), application specific integrated circuits (ASICs), application specific standard products (ASSPs), system-on-chip (SOC) systems, load programmable logic devices (CPLDs), computer hardware, firmware, software, and/or combinations thereof. These various embodiments may include being implemented in one or more computer programs executable and/or interpretable on a programmable system including at least one programmable processor. The programmable processor may be a specific or generic programmable processor that may receive data and instructions from a storage system, at least one input device, and at least one output device, and transmit data and instructions to the storage system, the at least one input device, and the at least one output device.

Program codes for implementing the method in embodiments of the present disclosure may be written in one or more programming languages in any combination. These program codes may be provided to a processor or a controller of a generic computer, a specific computer or other programmable data processing devices, such that the program codes, when executed by the processor or the controller, causes the functions/operations specified in the flowcharts and/or block diagrams to be implemented. The program codes may be entirely executed on a machine, partly executed on the machine, partly executed on the machine and partly executed on a remote machine as a stand-alone software package, or entirely executed on the remote machine or a server.

In the context of the present disclosure, the machine-readable medium may be a tangible medium that may contain or store a program for use by or in conjunction with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the foregoing. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), a fiber optic, a portable compact disk read only memory (CD-ROM), an optical storage device, a magnetic storage device, or any suitable combination of the foregoing.

To provide interaction with a user, the systems and techniques described herein may be implemented on a computer having a display apparatus (e.g., a cathode ray tube (CRT) or a liquid crystal display (LCD) monitor) for displaying information to the user; and a keyboard and a pointing apparatus (e.g., a mouse or a trackball) through which the user can provide an input to the computer. Other kinds of apparatuses can also be used to provide interaction with the user; for example, a feedback provided to the user can be any form of sensory feedback (e.g., a visual feedback, an auditory feedback, or a tactile feedback); and the input from the user may be received in any form (including acoustic input, voice input, or tactile input).

The systems and techniques described herein can be implemented in a computing system including a back-end component (e.g., as a data server), a computing system including a middleware component (e.g., an application server), a computing system including a front-end component (e.g., a user computer having a graphical user interface or a web browser through which a user may interact with implementations of the systems and techniques described herein), or a computing system that includes any combination of the back-end component, the middleware component, or the front-end component. The components of the system may be connected with each other via any form or medium of digital data communication (e.g., a communication network). An example of the communication network includes a local area network (LAN), a wide area network (WAN), the Internet and a blockchain network.

The computer system may include a client and a server. The client and the server are generally remote from each other and usually interact with each other through a communication network. A relationship of the client and the server is generated by a computer program that runs on a corresponding computer and has a client-server relationship with each other. The server can be a cloud server, also referred to a cloud computing server or a cloud host, and is a host product in the cloud computing service system to solve problems of difficult management and weak business expansibility in the traditional physical host and virtual private server (abbreviated as "VPS") service. The server can also be a server of a distributed system, or a server combined with a blockchain.

According to an embodiment of the present disclosure, the present disclosure also provides a computer-readable storage medium having stored therein a computer program that, when executed by a processor, causes the processor to implement the method for large scene elastic semantic representation and self-supervised light field reconstruction in the above-mentioned embodiments.

According to an embodiment of the present disclosure, the present disclosure also provides a computer program product including instructions that, when executed by a processor, causes the processor to implement the method for large scene elastic semantic representation and self-supervised light field reconstruction in the above-mentioned embodiments.

It can be understood that various forms of flowcharts shown above can be used to reorder, add, or remove steps. For example, the steps described in the present disclosure may be performed in parallel, sequentially, or in a different order. There is no limitation herein as long as the desired results of the technical solutions disclosed herein can be realized.

The above-mentioned specific embodiments do not constitute a limitation on the scope of protection of the present disclosure. It can be understood by those skilled in the art that various modifications, combinations, sub-combinations and substitutions can be made depending on design requirements and other factors. Any modifications, equivalent replacements, and improvements made within the spirit and principle of the present disclosure can be included within the protection scope of the present disclosure.

What is claimed is:

1. A method for large scene elastic semantic representation and self-supervised light field reconstruction, comprising:

acquiring a first depth map set corresponding to a target scene, wherein the first depth map set comprises a first depth map corresponding to at least one angle of view;

acquiring a third depth map set corresponding to the first depth map set through an initial elastic semantic reconstruction model, and in response to determining that the third depth map set satisfies a model iteration condition, performing iterative joint optimization training on the initial elastic semantic reconstruction model in an elastic semantic representation and a scene geometry until the third depth map set does not satisfy the model iteration condition, obtaining a target elastic semantic reconstruction model, and taking the third depth map set which does not satisfy the model iteration condition as a second depth map set, the second depth map set comprising a second depth map corresponding to the at least one angle of view, wherein when performing the iterative joint optimization training on the initial elastic semantic reconstruction model in the elastic semantic representation and the scene geometry, a depth consistency and boundary occlusion relationship of connected areas on a surface of an object are taken as self-supervised signals to supervise a neural network to learn pixel-by-pixel semantic features, and a learned elastic semantic representation with variable scale and shape is used for depth reconstruction; and fusing the second depth map corresponding to the at least one angle of view to obtain a target scene point cloud corresponding to the target scene.

2. The method of claim 1, wherein acquiring the first depth map set corresponding to the target scene comprises:

acquiring first depth maps, normal vector maps and confidence measure maps corresponding to the at least one angle of view in the target scene by using a light field reconstruction algorithm, wherein the first depth maps, the normal vector maps and the confidence measure maps are in one-to-one correspondence; and determining the first depth map set corresponding to the target scene according to the first depth maps, the normal vector maps and the confidence measure maps corresponding to the at least one angle of view.

3. The method of claim 2, determining the second depth map set by:

determining an elastic semantic representation corresponding to any one of the first depth maps;

determining a candidate point set corresponding to the first depth map according to the elastic semantic representation, and a normal vector map and a confidence measure map corresponding to the first depth map, wherein the candidate point set comprises at least one candidate point; and controlling the at least one candidate point to respectively perform pixel propagation in the first depth map to obtain the second depth map set.

4. The method of claim 3, wherein controlling the at least one candidate point to respectively perform pixel propagation in the first depth map to obtain the second depth map set comprises:

controlling the at least one candidate point to respectively perform pixel propagation in the first depth map to obtain a second propagation depth map set, wherein the second propagation depth map set comprises at least one second propagation depth map, and the at least one second propagation depth map is in one-to-one correspondence to the at least one candidate point;

randomly disturbing the first depth map to obtain a first depth; and evaluating the first depth and a second depth corresponding to the at least one second propagation depth map, and selecting a second propagation depth map with an evaluation result satisfying a depth condition as the second depth map.

5. The method of claim 4, wherein evaluating the first depth and the second depth corresponding to the at least one second propagation depth map comprises:
performing a photometric consistency measure, a semantic consistency measure, and a smoothness measure within a reference angle of view across an angle of view on the first depth and an angle of view on the second depth corresponding to the at least one second propagation depth map.

6. The method of claim 1, wherein performing iterative training on the initial elastic semantic reconstruction model comprises:
determining a contrastive loss function and a spatial aggregation loss function corresponding to the third depth map set;
determining an overall loss function according to the contrastive loss function and the spatial aggregation loss function; and
performing backpropagation training on the initial elastic semantic reconstruction model according to the overall loss function.

7. The method of claim 6, wherein the third depth map set includes a third depth map corresponding to the at least one angle of view, and determining the contrastive loss function corresponding to the third depth map set comprises:
determining a confidence corresponding to each pixel in the third depth map corresponding to the at least one angle of view to obtain a target pixel set, wherein the target pixel set comprises at least one target pixel, and the confidence of the at least one target pixel is not less than a confidence threshold; and
determining a sum of contrastive learning loss functions corresponding to all target pixels in the target pixel set as the contrastive loss function.

8. The method of claim 6, wherein the third depth map set comprises a third depth map corresponding to the at least one angle of view, and determining the spatial aggregation loss function corresponding to the third depth map set comprises:
performing Gaussian sampling on each pixel in the third depth map corresponding to the at least one angle of view to obtain an inspection point set corresponding to a pixel, wherein the inspection point set comprises at least one inspection point; and
determining the spatial aggregation loss function according to the inspection point set.

* * * * *